United States Patent [19]
Burkus, II et al.

[11] Patent Number: 5,912,203
[45] Date of Patent: Jun. 15, 1999

[54] PROCESS TO SYNTHESIZE A LINEAR PHOSPHONITRILIC CHLORIDE CATALYST

[75] Inventors: Frank Steven Burkus, II, Troy, N.Y.; Michael Lee White, Pittsburgh, Pa.

[73] Assignee: General Electric Company, Schenectady, N.Y.

[21] Appl. No.: 09/002,099

[22] Filed: Dec. 31, 1997

[51] Int. Cl.$^6$ .............................. B01J 27/24; B01J 27/14; B01J 27/10
[52] U.S. Cl. ........................... 502/200; 502/208; 502/224
[58] Field of Search ..................................... 502/200, 208, 502/224

[56] References Cited

U.S. PATENT DOCUMENTS

| | | |
|---|---|---|
| 3,156,668 | 11/1964 | Pike . |
| 3,839,388 | 10/1974 | Nitzsche et al. . |
| 5,210,129 | 5/1993 | de la Croi Habimana et al. . |
| 5,585,451 | 12/1996 | Burkus, II et al. . |

OTHER PUBLICATIONS

"Elucidation of the Reaction of Phosphorous Pentachloride and Ammonium Chloride by Phosphorus–31 Nuclear Magnetic Resonance Spectroscopy", by J. Emsley et al., Inorganic Physics Theor., May 1970, pp. 3025–3029.

*Primary Examiner*—Elizabeth D. Wood
*Attorney, Agent, or Firm*—Noreen C. Johnson; Douglas E. Stoner

[57] ABSTRACT

The present invention relates to a process for the synthesis of a linear phosphonitrilic chloride (LPNC) catalyst solution. The process involves mixing phosphorus pentachloride with a suitable silazane in a methylene chloride medium. The methylene chloride is then replaced with a siloxane medium followed by heating this mixture to form a LPNC catalyst solution.

13 Claims, No Drawings

PROCESS TO SYNTHESIZE A LINEAR PHOSPHONITRILIC CHLORIDE CATALYST

FIELD OF INVENTION

The present invention relates to a process of preparing a linear phosphonitrilic chloride catalyst (LPNC).

BACKGROUND OF THE INVENTION

Linear phosphonitrilic chloride (LPNC) has been used as a catalyst to equilibrate organopolysiloxanes. Other LPNC-type materials, such as $Cl_2PONPCl_3$ "PONP", have also been found to be effective as catalysts. These materials, hereinafter collectively designated "phosphorus-nitrogen chloride" (PNC), have been made by procedures involving the use of $PCl_5$ and an ammonium salt, as disclosed in U.S. Pat. No. 3,839,388.

U.S. Pat. No. 3,839,388 discloses the use of vacuum in combination with a phosphonitrilic halide as an equilibration catalyst to facilitate the condensation and/or equilibration of silanol fluids. This process deals with the synthesis of the catalytic linear phosphonitrilic chloride (LPNC) species. This process utilizes toxic solvents, expensive separation techniques, and long reaction times. Such process drawbacks limit the production, and subsequent use of such catalysts in industry.

Preparation of LPNC catalysts has been disclosed by Emsley et. al in J. Chem. Soc. (A), 1970. This process uses phosphorus pentachloride and ammonium chloride as starting materials in solvents such as nitrobenzene. The reaction is carried out at elevated temperatures (>130° C.) and requires separation techniques for handling the air sensitive solids. Similarly, U.S. Pat. No. 5,210,129 uses phosphorus pentachloride and ammonium chloride as starting materials for the synthesis of LPNC catalysts. The reaction temperatures vary between 100° C. and 220° C., and the preferred reaction time is in excess of 6 hours.

The processes used for the synthesis of LPNC catalysts either use undesirable toxic solvents, have longer reaction times, and need temperatures well in excess of 100° C. Such requirements makes it difficult to make LPNC catalysts on larger scales and hampers their ease of use. There is thus a need for a process to make a LPNC catalyst that can be easily handled and used. It is desirable to have such procedures avoid the use of toxic solvents or cumbersome techniques. The process needs to be convenient such that the LPNC thus synthesized could be easily used as a catalyst without lengthy isolation procedures.

It has been surprisingly found that the process of the present invention can be carried out without using undesirable solvents such as nitrobenzene or tetrachloroethane. The process yields LPNC in a siloxane medium, which is preferred for storage and use because of compatibility with the utility of LPNC as an organosiloxane catalyst.

SUMMARY OF THE INVENTION

The present invention provides a process comprising (a) mixing phosphorus pentachloride and a suitable silazane in a methylene chloride medium to form a first reaction mixture; (b) replacing the methylene chloride in the first reaction mixture with a siloxane medium to form a second reaction mixture; and (c) elevating the second reaction mixture to an effective temperature to yield a phosphonitrilic chloride catalyst (LPNC) solution.

DETAILED DESCRIPTION OF THE INVENTION

A preferred embodiment of the present invention provides a process comprising: (a) combining phosphorus pentachloride with the suitable silazane in a molar ratio of from about 1:1 to about 4:1, in a methylene chloride medium at a temperature of from about −10° C. to about 60° C. to form the first reaction mixture; (b) replacing the methylene chloride medium from the first reaction mixture with a siloxane carrier to form the second reaction medium; and (c) elevating the second reaction mixture for up to about 5 hours to a temperature of from about 90° C. to about 150° C. to yield a linear phosphonitrilic chloride catalyst solution.

A further preferred embodiment of the instantly claimed invention provides a process wherein the silazane is represented by:

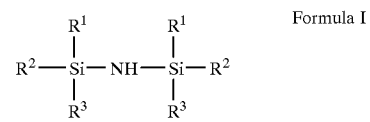
Formula I and the siloxane medium is represented by

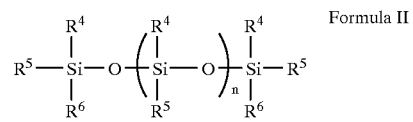
Formula II wherein $R_1$, $R_2$, $R_3$, $R_4$, $R_5$, and $R_6$ independently at each occurrence represent H, $C_{1-8}$ alkyl; $C_{1-8}$ haloalkyl, $C_{1-8}$ alkenyl; C3-8 cycloalkyl; $C_{3-8}$ cycloalkenyl; $C_{6-13}$ aryl; or $C_{6-13}$ haloaryl; and n represents an integer from 0 to 1000.

Another preferred embodiment provides a process wherein $R^1$ independently at each occurrence represents $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, or H; $R^2$ independently at each occurrence represents $C_{2-6}$ alkenyl, or $C_{2-6}$ haloalkenyl; $R^3$ independently at each occurrence represents $C_{6-13}$ aryl, $C_{7-13}$ aralkyl, or $C_{7-13}$ halo aralkyl; $R^4$ and $R^6$ independently at each occurrence represent H, $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, $C_{2-6}$ alkenyl, $C_{2-6}$ haloalkenyl, $C_{6-13}$ aryl, $C_{7-13}$ aralkyl, or $C_{7-13}$ halo aralkyl; and $R^5$ represents $C_{1-4}$ alkyl.

A further preferred embodiment provides a process wherein the molar ratio of phosphorus pentachloride to the silazane is from about 2:1 to about 3:1, and wherein the phosphorus pentachloride and the silazane are combined at a temperature of from about −5° C. to about 40° C., the particularly preferred temperature being fromabout0° C. to about 30° C. Yet another preferred embodiment provides a process wherein the second reaction mixture is elevated to a temperature of from about 100° C. to about 130° C. Preferred silazane used in the process of the present invention is tetramethyldivinylsilazane or hexamethyldisilazane, while the preferred siloxane medium is 20 cP hexamethylsiloxane terminated polydimethylsiloxane (PDMS).

As used herein a suitable silazane refers to silazanes that will effectively react with $PCl_5$ to give the desired LPNC catalyst species with the evolution of a non-interfering byproduct. Such silazanes react within the temperature range of the invention, are stable prior to use (when used under conditions known to one skilled in the art), and react to give the desired LPNC product. An illustrative example of a suitable silazane is represented by Formula I.

A siloxane medium, as used herein, is one which, when mixed with the catalyst in a molar ratio of about 0.001 to about 0.99 (ratio of catalyst to the siloxane medium), produces a one phase catalytically active solution. The siloxane medium must not adversely affect LPNC or LPNC-like species thereby deactivating them. An illustrative example of a siloxane medium is represented by Formula II.

Also, as used herein, an effective temperature is a temperature at which at least some LPNC catalyst is formed. An alkyl group is intended to include a straight chain alkyl and branched alkyl. It is understood that solvents known to one skilled in the art to be interchangeable with methylene chloride can also be used in the present invention.

At is known to one skilled in the art that the LPNC activity can be increased by adding an acid or a proton source to a LPNC solution before use, as disclosed in U.S. Pat. No. 5,585,451. This is applicable to the LPNC catalyst synthesized by the process of the instant invention, and is incorporated herein by reference.

EXAMPLES

The following examples are practiced in accordance with the preceding disclosure, with further details being specified below.

General Procedure

The LPNC catalyst is prepared by combining $PCl_5$ and hexamethyldisilazane (HMDZ) in about a 2:1 to about a 3:1 molar ratio at a temperature of about 0° C. in a siloxane medium. The reaction mixture is stirred for about 1 hour at the lower temperature, after which the reaction mixture is gradually warmed up to a temperature of about 90–150° C. The reaction mixture is heated at the elevated temperature for about 1–3 hours resulting in a clear solution. The clearing of the solution is an indication of the formation of the LPNC catalyst. This resulting clear solution is then cooled to room temperature and the LPNC catalyst formed is then ready for use. The activity of this LPNC catalyst can be enhanced by the addition of a proton source, such as a strong protic acid, to the LPNC solution before use.

Example 1

In a 1 L 3 neck 500 ml round bottom flask equipped with a magnetic stirring apparatus, pressure equalizing addition funnel, water condenser, and $N_2$ inlet and outlet, 200 ml dichloromethane and 100 g (0.48 mol) $PCl_5$ was charged. Stirring was initiated vigorously. 50.5 ml HMDZ (0.24 mol) was added dropwise via a pressure equalizing addition funnel over a 30 minute time period. After the addition of the reagents, the mixture was stirred for an additional one hour, then the mixture was transferred to a one neck round bottom flask and the low boilers were removed via distillation at a reduced pressure.

The recovered solids were dissolved in dichloromethane to form a 2% catalyst solution (wt/volume) which was checked for activity and found to be a very efficient catalyst for the polycondensation of $\alpha,\omega$-siloxanediols.

What is claimed is:

1. A process for the synthesis of linear phosphonitrilic chloride catalyst (LPNC) comprising:

(a) combining phosphorus pentachloride with a suitable silazane in a methylene chloride medium to form a first reaction mixture;

(b) replacing the methylene chloride medium in the first reaction mixture with a siloxane medium to form a second reaction mixture; and (c) elevating the second reaction mixture to a temperature effective to form a LPNC catalyst solution.

2. A process of claim 1 comprising:

(a) combining phosphorus pentachloride with the suitable silazane in a molar ratio of from about 1:1 to about 4:1, in a methylene chloride medium at a temperature of from about −10° C. to about 60° C. to form a first reaction mixture;

(b) replacing the methylene chloride medium from the first reaction mixture with a siloxane medium, to form a second reaction medium; and (c) elevating the second reaction mixture for about 1 to about 5 hours to a temperature of from about 90° C. to about 150° C. to yield a linear phosphonitrilic chloride catalyst solution.

3. A process of claim 2 wherein the silazane is represented by

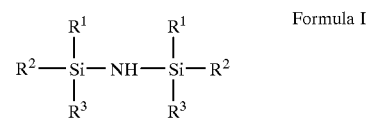

$R^1$, $R^2$, and $R^3$ independently at each occurrence represent H, $C_{1-8}$ alkyl, $C_{1-8}$ haloalkyl, $C_{1-8}$ alkenyl, $C_{3-8}$ cycloalkyl, $C_{3-8}$ cycloalkenyl, $C_{6-13}$ aryl, or $C_{6-13}$ haloaryl.

4. A process of claim 3 wherein the siloxane medium is represented by

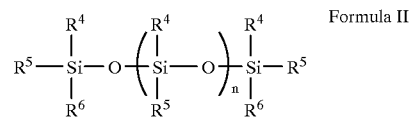

wherein:

$R_4$, $R_5$, and $R_6$ independently at each occurance represent H, $C_{1-8}$ alkyl, $C_{1-8}$ haloalkyl, $C_{1-8}$ alkenyl, $C_{3-8}$ cycloalkyl, $C_{3-8}$ cycloalkenyl, $C_{6-13}$aryl, or $C_{6-13}$ haloaryl; and n represents an integer from 0 to 1000.

5. A process of claim 4 wherein:

$R^1$ independently at each occurrence represents $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, or H;

$R^2$ independently at each occurrence represents $C_{2-6}$ alkenyl, or $C_{2-6}$ haloalkenyl; and $R^3$ independently at each occurrence represents $C_{6-13}$ aryl, $C_{7-13}$ aralkyl, or $C_{7-13}$ halo aralkyl.

6. A process of claim 5 wherein:

$R^4$ and $R^6$ independently at each occurrence represent H, $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, $C_{2-6}$ alkenyl, $C_{2-6}$ haloalkenyl; and $C_{6-13}$ aryl, $C_{7-13}$ aralkyl, or $C_{7-13}$ halo aralkyl; and $R^5$ represents $C_{1-4}$ alkyl.

7. A process of claim 6 wherein the molar ratio of the phosphorus pentachloride to the silazane is from about 2:1 to about 3:1.

8. A process of claim 7 wherein the phosphorus pentachloride and the silazane are-combined at a temperature of from about $-5°$ C. to about $40°$ C.

9. A process of claim 8 wherein the temperature is from about $0°$ C. to about $30°$ C.

10. A process of claim 9 wherein the second reaction mixture is elevated to a temperature of from about $100°$ C. to about $130°$ C.

11. A process of claim 10 wherein the silazane is tetramethyldivinyl silazane or hexamethyldisilazane.

12. A process of claim 11 wherein the siloxane medium is 20 cP hexamethylsiloxane terminated polydimethylsiloxane (PDMS).

13. A process of claim 12 wherein $R^1$ and $R^6$ represent trifluoropropyl and $R^3$ represents chlorophenyl.

* * * * *